(12) United States Patent
Shen

(10) Patent No.: US 12,034,307 B2
(45) Date of Patent: Jul. 9, 2024

(54) MPC-BASED HIERARCHICAL COORDINATED CONTROL METHOD AND DEVICE FOR WIND-HYDROGEN COUPLING SYSTEM

(71) Applicant: TONGJI UNIVERSITY, Shanghai (CN)

(72) Inventor: Xiaojun Shen, Shanghai (CN)

(73) Assignee: TONGJI UNIVERSITY, Shanghai (CN)

(*) Notice: Subject to any disclaimer, the term of this patent is extended or adjusted under 35 U.S.C. 154(b) by 268 days.

(21) Appl. No.: 17/638,191

(22) PCT Filed: Aug. 2, 2021

(86) PCT No.: PCT/CN2021/110036
§ 371 (c)(1),
(2) Date: Feb. 25, 2022

(87) PCT Pub. No.: WO2022/042216
PCT Pub. Date: Mar. 3, 2022

(65) Prior Publication Data
US 2023/0043165 A1    Feb. 9, 2023

(30) Foreign Application Priority Data
Aug. 25, 2020  (CN) .................. 202010863668.4

(51) Int. Cl.
*H02J 3/38*       (2006.01)
*G05B 13/04*    (2006.01)
*H02J 15/00*    (2006.01)

(52) U.S. Cl.
CPC ............ *H02J 3/381* (2013.01); *G05B 13/048* (2013.01); *H02J 15/008* (2020.01); *H02J 2203/20* (2020.01); *H02J 2300/28* (2020.01)

(58) Field of Classification Search
CPC .. C25B 1/04; C25B 15/02; C25B 9/70; F03D 9/19; G05B 13/048; H02J 15/008;
(Continued)

(56) References Cited

U.S. PATENT DOCUMENTS

| | | | | |
|---|---|---|---|---|
| 6,056,781 | A | * | 5/2000 | Wassick ............... G05B 13/048 703/2 |
| 2007/0216165 | A1 | * | 9/2007 | Oohara ..................... H02P 9/00 290/44 |
| 2012/0175954 | A1 | * | 7/2012 | Hinatsu ..................... C25B 1/04 307/31 |

FOREIGN PATENT DOCUMENTS

| CN | 105337310 |   | 2/2016 |
|---|---|---|---|
| CN | 1046802468 B | * | 12/2017 |

(Continued)

OTHER PUBLICATIONS

Yang et al, A Hierarchical Self-Regulation Control for Economic Operation of AC/DC Hybrid Microgrid With Hydrogen Energy Storage System; 2019, IEEE, pp. 89330-89341. (Year: 2019).*

(Continued)

*Primary Examiner* — Kidest Bahta
(74) *Attorney, Agent, or Firm* — JCIP GLOBAL INC.

(57) ABSTRACT

The present invention relates to an MPC-based hierarchical coordinated control method and device for a wind-hydrogen coupling system. The method comprises the following steps: (1) dividing the wind-hydrogen coupling system into upper-layer grid-connected control and lower-layer electrolytic cell control; (2) controlling grid-connected power to track a wind power prediction curve by adopting an MPC control algorithm for upper-layer grid-connected control, and obtaining an electrolytic cell power control quantity for the lower-layer electrolytic cell control at the same time; (3) dividing operation states of electrolytic cell monomers into four operation states of rated power operation, fluctuating power (Continued)

operation, overload power operation and shutdown; and (4) determining the operation states of various electrolytic cell monomers by adopting a time-power double-line rotation control strategy based on the electrolytic cell power control quantity, thus making the electrolytic cell monomers operate in one of the four operating states in turn.

10 Claims, 7 Drawing Sheets

(58) Field of Classification Search
CPC ...... H02J 2203/20; H02J 2300/28; H02J 3/28; H02J 3/381; Y02E 10/76; Y02E 60/36; Y02E 70/30; Y02P 20/133
See application file for complete search history.

(56) References Cited

FOREIGN PATENT DOCUMENTS

| CN | 108206547 | 6/2018 |
|---|---|---|
| CN | 110707749 | 1/2020 |
| CN | 111463826 | 7/2020 |
| CN | 112103994 | 12/2020 |
| JP | H0491638 | 3/1992 |

OTHER PUBLICATIONS

Xia et al., i-Level Model Predictive Control for Optimal Coordination of Multi-Area Automatic Generation Control Units under Wind Power Integration, Aug. 22, 2019, China Three Gorges University, College of Electrical Engineering and New Energy, pp. 1-19 (Year: 2019).*

International Search Report (Form PCT/ISA/210) of PCT/CN2021/110036, mailed on Nov. 4, 2021, pp. 1-4.

Cai Guowei et al., "Control strategy of wind-hydrogen coupled grid-connected system", Acta Energiae Solaris Sinica, vol. 39, Issue 10, Oct. 2018, with English abstract, pp. 1-12.

* cited by examiner

MPC-BASED HIERARCHICAL COORDINATED CONTROL METHOD AND DEVICE FOR WIND-HYDROGEN COUPLING SYSTEM

CROSS-REFERENCE TO RELATED APPLICATION

This application is a 371 of international application of PCT application serial no. PCT/CN2021/110036, filed on Aug. 2, 2021, which claims the priority benefit of China application no. 202010863668.4, filed on Aug. 25, 2020. The entirety of each of the above mentioned patent applications is hereby incorporated by reference herein and made a part of this specification.

BACKGROUND

Technical Field

The present invention relates to a control method and device for a wind-hydrogen coupling system, and in particular relates to an MPC-based hierarchical coordinated control method and device for a wind-hydrogen coupling system.

Description of Related Art

With the gradual depletion of traditional fossil energy sources, the development and utilization of new energy sources has become a research hotspot today. Clean energy represented by the wind energy is getting more and more attention. However, due to its volatility and randomness, the grid-connection rate of wind power generation has been at a low level, and energy waste is produced due to the fact that a large amount of electric energy converted from wind energy has to be curtailed. On the other hand, hydrogen energy, as a clean fuel with high energy density, has also received much attention, but the cost of hydrogen production by electric energy has hindered the large-scale application of the hydrogen. It is a perfect method to combine the wind energy and the hydrogen energy, that is, the wind curtailment problem is solved, and the production cost of the hydrogen is greatly reduced, which advances the development of hydrogen as a clean energy source.

When a wind-hydrogen coupling system is in grid-connected operation, the wind energy is converted into electric energy by a wind turbine, the energy is transmitted to a power grid through a current collection wire, and meanwhile, an electrolytic cell system is used as energy storage equipment for stabilizing wind power fluctuation to consume part of the electric energy. When the power grid is partially disconnected, it is in the off-grid operation, the wind power is completely absorbed by the electrolytic cell for hydrogen production at the moment. Common large-scale wind power plants are grid-connected, where most of the wind power is smoothed by an energy storage system and then absorbed in a grid-connected manner, which are common in offshore wind power plants and large onshore wind power plants; off-grid systems are generally small in capacity, where renewable energy is completely transmitted to the energy storage system or an electrolytic cell hydrogen production system for absorption after passing through a converter, which are common in small-scale power generation in islands and remote areas.

In an actual large-scale wind-hydrogen coupling system, due to the fact that the capacity of single electrolytic cell equipment is limited, the electrolytic cell system is formed by combining a plurality of electrolytic cell monomers; if the internal power distribution of the electrolytic cell system is not regulated, random drift of working points of the electrolytic cell may be caused by the randomness and instability of the wind power, thus affecting the hydrogen production, service life and the efficiency of the electrolytic cell.

SUMMARY

An objective of the present invention is to provide an MPC-based hierarchical coordinated control method and device for a wind-hydrogen coupling system to overcome defects in the prior art.

The objective of the present invention can be achieved through the following technical solutions:

an MPC-based hierarchical coordinated control method for a wind-hydrogen coupling system comprises the following steps:

(1) dividing the wind-hydrogen coupling system into upper-layer grid-connected control and lower-layer electrolytic cell control;

(2) controlling grid-connected power to track a wind power prediction curve by adopting an MPC control algorithm for upper-layer grid-connected control, and obtaining an electrolytic cell power control quantity for the lower-layer electrolytic cell control at the same time;

(3) dividing operation states of electrolytic cell monomers into four operation states of rated power operation, fluctuating power operation, overload power operation and shutdown; and (4) determining the operation states of various electrolytic cell monomers by adopting a time-power double-line rotation control strategy based on the electrolytic cell power control quantity, thus making the electrolytic cell monomers operate in one of the four operating states in turn.

Preferably, the step (2) is specifically as follows:

(21) constructing a prediction model based on dynamic matrix control:

$$\begin{cases} x(k+1) = Ax(k) + B_u u(k) + B_d d(k) \\ y(k) = Cx(k) + Du(k) \end{cases}$$

wherein $x(k)$ is a state quantity, $u(k)$ is a control input, $d(k)$ is disturbance, $y(k)$ is an output, $A$, $B_u$, $B_d$, $C$ and $D$ are coefficient matrices, specifically as follows:

$$x(k) = \begin{bmatrix} x_1(k) \\ x_2(k) \end{bmatrix} = \begin{bmatrix} P_G(k) \\ P(k) \end{bmatrix},$$

$$u(k) = P_{el}(k),$$

$$y(k) = P_G(k),$$

$$d(k) = P_W(k),$$

$$A = \begin{bmatrix} 0 & 0 \\ 0 & 1 \end{bmatrix},$$

$$B_u = \begin{bmatrix} -1 \\ \eta T p_0 / V \end{bmatrix},$$

$$B_d = \begin{bmatrix} 1 \\ 0 \end{bmatrix},$$

-continued $$C = \begin{bmatrix} 1 \\ 0 \end{bmatrix},$$

$$D = [0\ 0],$$

wherein k is a sampling moment, $P_G(k)$ denotes the grid-connected power, P(k) denotes the pressure of a hydrogen storage tank, $P_{el}(k)$ denotes the electrolytic cell power control quantity, $P_W(k)$ denotes wind turbine power of a wind power plant, η denotes a conversion efficiency of converting electric energy consumed by the electrolytic cell into a certain volume of hydrogen energy, T is a sampling time interval, V is the volume of the hydrogen storage tank, $p_0$ is the standard atmospheric pressure, and $p_0$=0.1 MPa;

(22) constructing a constraint:

$$P_{el\ min} \leq P_{el}(k) \leq P_{el\ max},$$

$$P_{min} \leq P(k) \leq P_{max},$$

wherein $P_{el\ min}$ is the minimum power of an electrolytic cell array, $P_{el\ max}$ is the maximum power of the electrolytic cell array, $P_{min}$ is the minimum pressure of a hydrogen storage tank system, and $P_{max}$ is the maximum pressure of the hydrogen storage tank system;

(23) constructing a target function:

$$\min J(k) = \sum_{i=1}^{P} q_i (P'_W(k+i) - P_G(k+i|k))^2 + \sum_{j=1}^{M} r_j \Delta P_{el}^2(k+j-1)$$

wherein P denotes a prediction length of the dynamic matrix control, M denotes a control length of the dynamic matrix control, $P_W'(k+i)$ denotes a prediction value of the wind power at the moment k+i in the wind power prediction curve, $P_G(k+i|k)$ denotes grid-connected power at the moment k+i predicted and output at the prediction moment k, $\Delta P_{el}(k+j-1)$ denotes an electrolytic cell power control quantity increment at the k+j−1 moment, and $q_i$ and $r_j$ are an error output weight coefficient and a control increment weight coefficient at the moment i from the moment k;

(24) according to the prediction model and constraint conditions, solving M electrolytic cell power control quantity increments enabling the target function to be optimal, and obtaining the electrolytic cell power control quantity for the lower-layer electrolytic cell control based on the first control increment.

Preferably, the step (4) is specifically as follows:

(41) sequencing the electrolytic cell monomers in the electrolytic cell array, determining rotation cycles, and adjusting the arrangement sequence of the electrolytic cell monomers at the end of each rotation cycle;

(42) at an initial moment of each rotation cycle, determining the number of the electrolytic cell monomers operating in four operation states according to the electrolytic cell power control quantity, sequentially assigning the operation states of various electrolytic cell monomers from the electrolytic cell monomer at the first position backwards according to the current arrangement sequence of the electrolytic cell monomers; within a time period of the rotation cycle, when the electrolytic cell power control quantity fluctuates, determining the number of the electrolytic cell monomers operating in the four operation states according to the current electrolytic cell power control quantity, and based on the electrolytic cell monomers in the fluctuating power operation state at a previous moment, still configuring the electrolytic cell monomers in the fluctuating power operation state at the previous moment to be in the fluctuating power operation state; and meanwhile, sequentially configuring the operation states of various electrolytic cell monomers forwards until reaching the electrolytic cell monomer at the first position, and then continuing to sequentially configure working states of various electrolytic cell monomers forwards from the electrolytic cell monomer at the last position until reaching the electrolytic cell monomer in the fluctuating power operation state.

Preferably, a specific mode of adjusting an arrangement sequence of the electrolytic cell monomers in the step (41) is as follows: moving the electrolytic cell monomer at the first position in the previous rotation cycle to the last position.

Preferably, a specific mode of determining the number of the electrolytic cell monomers at the initial moment of each rotation cycle as well as within the time period of the rotation cycle in the step (42) is as follows:

(421) determining whether the electrolytic cell array is in an overload state or not according to the electrolytic cell power control quantity $P_{el}$ and an actually configured capacity $P_{pz}$ of the electrolytic cell array, and if $P_{el} \leq P_{pz}$, regarding that the electrolytic cell array is not overloaded, executing a step (422), otherwise, regarding that the electrolytic cell array is overloaded, executing a step (423), wherein $P_{pz}=nP_e$ and $P_e$ is the rated power of the electrolytic cell monomer, and n is the total configuration number of the electrolytic cell monomers;

(422) determining the number $N_{11}$ of the electrolytic cell monomers configured to be in a rated power operation state, the number $N_{12}$ of the electrolytic cell monomers configured to be in the fluctuating power operation state, and the number $N_{13}$ of the electrolytic cell monomers configured to be in a shutdown operation state according to the electrolytic cell power control quantity $P_{el}$, and satisfying that $N_{11}+N_{12}+N_{13}=n$; and (423) determining the number $N_{21}$ of the electrolytic cell monomers configured to be in an overload power operation state, the number $N_{22}$ of the electrolytic cell monomers configured to be in a fluctuating power operation state, and the number $N_{23}$ of the electrolytic cell monomers configured to be in the rated power operation state according to the electrolytic cell power control quantity $P_{el}$, and satisfying that $N_{21}+N_{22}+N_{23}=n$.

Preferably, $N_{11}$, $N_{12}$ and $N_{13}$ in the step (422) are specifically as follows:

$$N_{11} = \left\lfloor \frac{P_{el}}{P_e} \right\rfloor$$

wherein $\lfloor\ \rfloor$ denotes floor, if $N_{11}=n$, regarding that $N_{12}=N_{13}=0$, wherein all electrolytic cell monomers are configured to operate in the rated power operation state;

if $N_{11}<n$, regarding that $N_{12}=1$, $N_{13}=n-N_{11}-1$.

Preferably, $N_{21}$, $N_{22}$ and $N_{23}$ in the step (423) are specifically as follows:

firstly, determining an overload quantity $P_{OL}=P_{ef}-nP_e$, then, acquiring $N_{21}$ through the following formula, $$N_{21} = \left\lfloor \frac{P_{OL}}{(\varphi-1)P_e} \right\rfloor,$$

wherein $\lfloor \ \rfloor$ denotes floor, and finally, if $P_{OL}-N_{21}\cdot(\varphi-1)P_e=0$, regarding that $N_{22}=0$, $N_{23}=n-N_{21}$, if $P_{OL}-N_{21}\cdot(\varphi-1)/P_e\neq 0$, regarding that $N_{22}=1$, $N_{23}=n-N_{21}-1$, wherein $\varphi$ is an overload coefficient of the electrolytic cell.

Preferably, assigning the operation states of the electrolytic cell monomers at the initial moment of each rotation cycle in the step (42) is specifically as follows:

in a case of a non-overload state, sequentially configuring $N_{11}$ electrolytic cell monomers to operate in the rated power operation state, configuring $N_{12}$ electrolytic cell monomers to operate in the fluctuating power operation state, and configuring $N_{13}$ electrolytic cell monomers to operate in the shutdown power operation state backwards from the electrolytic cell monomer at the first position according to the current arrangement sequence of the electrolytic cell monomers; and in a case of an overload state, sequentially configuring $N_{21}$ electrolytic cell monomers to operate in the overload power operation state, configuring $N_{22}$ electrolytic cell monomers to operate in the fluctuating power operation state, and configuring $N_{23}$ electrolytic cell monomers to operate in the rated power operation state backwards from the electrolytic cell monomer at the first position according to the current arrangement sequence of the electrolytic cell monomers.

Preferably, configuring the operation states of various electrolytic cell monomer forwards within the time period of the rotation cycle based on the electrolytic cell monomer in the fluctuating power operation state at the previous moment in the step (42) is specifically as follows:

in a case of a non-overload state, configuring the electrolytic cell monomers in the rated operation state and the shutdown operation state according to the following mode: sequentially configuring the electrolytic cell monomers in the rated operation state and the shutdown operation state alternately until one operation state in the rated operation state or the shutdown operation state is completely configured, and then sequentially configuring the other operation state which is not completely configured; and in a case of an overload state, configuring the electrolytic cell monomers in the rated operation state and the overload operation state according to the following mode: sequentially configuring the electrolytic cell monomers in the rated operation state and the overload operation state alternately until one operation state in the rated operation state or the overload operation state is completely configured, and then sequentially configuring the other operation state which is not completely configured.

An MPC-based hierarchical coordinated control device for a wind-hydrogen coupling system is provided, wherein the device comprises a memory and a processor; the memory is used for storing computer programs, and the processor is used for implementing the MPC-based hierarchical coordinated control method for the wind-hydrogen coupling system when executing the computer programs.

Compared with the prior art, the present invention has the following advantages:

(1) the whole system employs a hierarchical control strategy, an MPC control algorithm (model predictive control) on the upper layer starts from the system level, the wind power is absorbed in a grid-connected manner as much as possible under a grid-connected condition, and an electrolytic cell control strategy on the lower layer is used to coordinate the power distribution of various electrolytic cell monomers;

(2) the wind power prediction and the dynamic matrix control are combined to develop a scheduling plan of the grid-connected power through the predicted wind power, and the tracking accuracy of the grid-connected power is improved by applying a dynamic matrix control algorithm; and (3) the lower layer employs a time-power double-line rotation control strategy, the time-based rotation is achieved by adjusting the arrangement sequence of the electrolytic cell monomers at the end of each rotation cycle, and the power-based rotation is achieved by configuring the operation states of other electrolytic cell monomers based on the electrolytic cell monomers in the fluctuating power operation state at the previous moment according to the electrolytic cell power control quantity in the rotation cycle; the influence of the temperature drop caused by the long shutdown time of the electrolytic cell on the reaction speed of the electrolytic cell can be avoided through the time-based rotation, the potential safety hazards caused by the fact that the power is lower than the hydrogen production safety power for a long time can be avoided through the power-based rotation, and the service life and the operation safety of the system can be prolonged by the double-line rotation strategy.

DESCRIPTION OF THE EMBODIMENTS

The present invention is described in detail below with reference to the accompanying drawings and specific embodiments. It should be noted that the following description of the embodiments is only substantially illustrative and the present invention is not intended to be limited to its applications or uses, and the present invention is not limited to the following embodiments.

Embodiment

Figure 1:
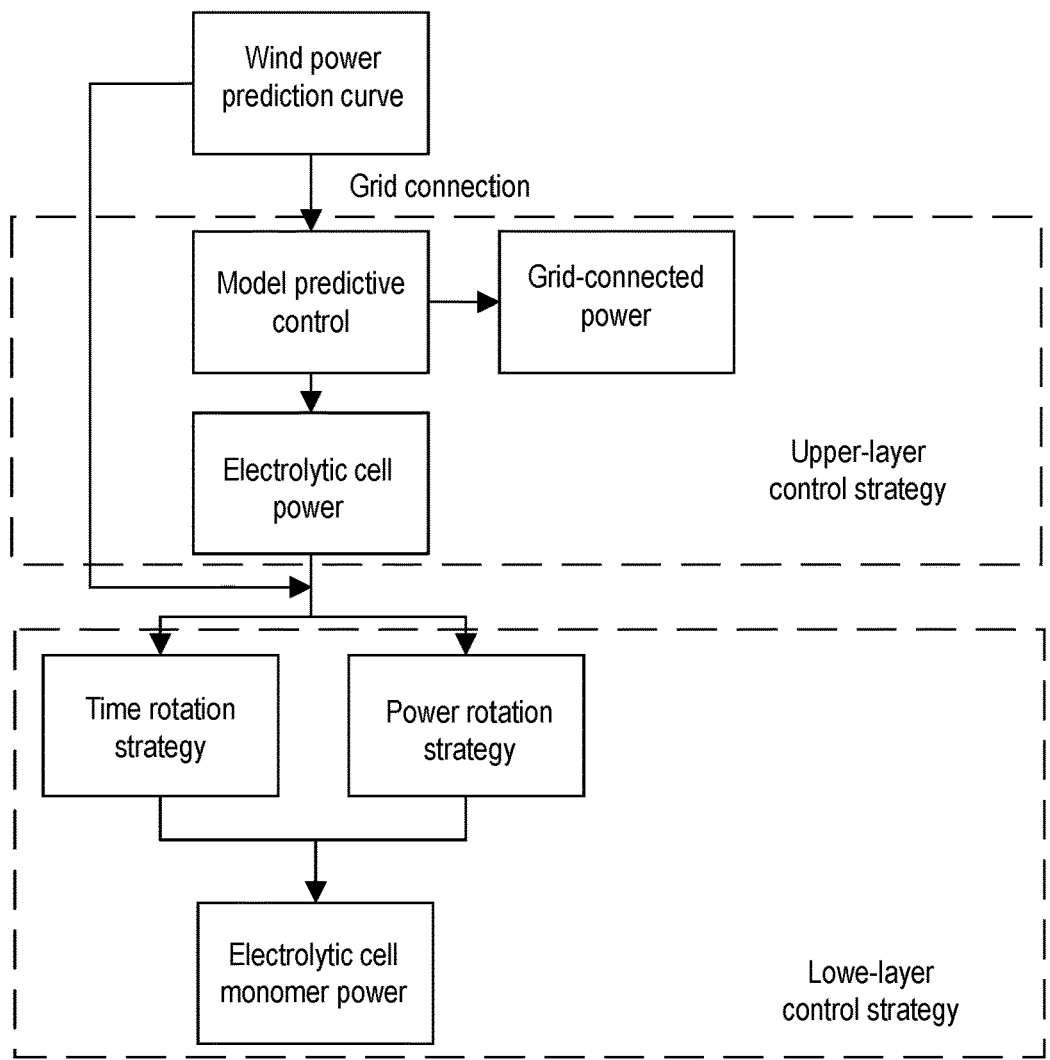
FIG. 1 is a flow block diagram of an MPC-based hierarchical coordinated control method for a wind-hydrogen coupling system of the present invention.

As shown in FIG. 1, an MPC-based hierarchical coordinated control method for a wind-hydrogen coupling system is provided, the method comprises the following steps:
(1) dividing the wind-hydrogen coupling system into upper-layer grid-connected control and lower-layer electrolytic cell control;
(2) controlling grid-connected power to track a wind power prediction curve by adopting an MPC control algorithm for upper-layer grid-connected control, and obtaining an electrolytic cell power control quantity for the lower-layer electrolytic cell control at the same time;
(3) dividing operation states of electrolytic cell monomers into four operation states of rated power operation, fluctuating power operation, overload power operation and shutdown; and
(4) determining the operation states of various electrolytic cell monomers by adopting a time-power double-line rotation control strategy based on the electrolytic cell power control quantity, thus making the electrolytic cell monomers operate in one of the four operating states in turn.

The upper-layer control strategy of the present invention is a system-level control strategy based on model predictive control (MPC), aiming at making the grid-connected power follow a grid-connected scheduling instruction obtained by wind power prediction to the greatest extent under a grid-connected working condition. The lower-layer control strategy is an electrolytic cell internal control strategy, aiming at optimizing the working state of an electrolytic cell system to achieve the purposes of prolonging the service life of the electrolytic cell system and improving the system operation safety.

Figure 2:
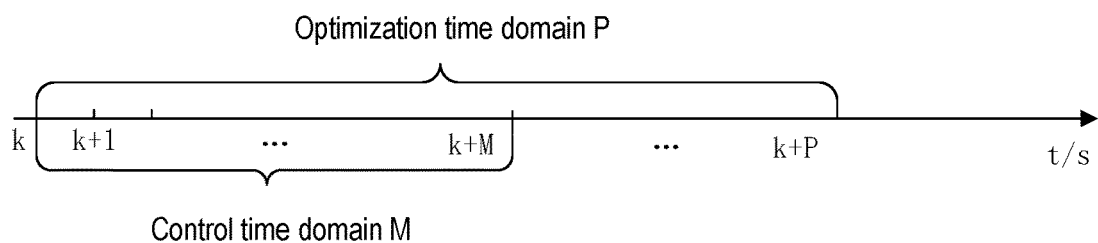
FIG. 2 is a control time domain diagram of DMC of the present invention.

The MPC is a type of special control. The current control action is obtained by solving a finite time domain open-loop optimal control problem at each sampling moment. The current state of the process is used as an initial state of the optimal control problem, and the obtained optimal control sequence only implement the first control action. This is the biggest difference the MPC from those algorithms that use pre-computed control law. There are dozens of algorithms for predictive control, among which the representative ones are mainly Model Algorithm Control (MAC), Dynamic Matrix Control (DMC) and Generalized Predictive Control (GPC). Wherein the DMC employs an object step response that is easy to measure in engineering as a model. The DMC algorithm is relatively simple, less in computation and strong in robustness, employs an incremental algorithm, and is an algorithm based on system step response; a digital integral link highly effective for eliminating system static error is included in the control of the DMC algorithm, which is a remarkable advantage of the DMC algorithm, thus the DMC algorithm is widely applied to the petrochemical industry, and the wind-hydrogen coupling system is controlled by adopting dynamic matrix control (DMC) in the present invention. Although there are various forms of predictive control algorithms, in a general sense, all predictive control algorithms contain three main components: predictive model, rolling optimization and feedback correction. Wherein the prediction model refers to a collection of information with a predictive function in general, which can be used as prediction model no matter what manifestation it has. The rolling optimization is the major characteristic of the predictive control, the predictive control determines the future control action through the optimization of a performance index that relates to the future behavior of the system, and it is usually desirable that a variance of an object output tracking a certain expected trajectory on future sampling points is the minimum. The optimization in the predictive control is conducted on-line repeatedly rather than off-line once, which is the meaning of the rolling optimization and is the fundamental characteristic that predictive control is different from the traditional optimal control. In predictive control, the optimization is established based on the system reality, and it strives to make relatively accurate prediction on the future dynamic behaviors of the system during optimization. Therefore, the optimization in the predictive control is not only based on the model, but also employs feedback information form closed-loop optimization. What is shown in FIG. 2 is a control time domain diagram of the DMC, in a case of considering the optimization time domain P, the rolling optimization is that M control quantities of the control time domain M are computed, but only the first control quantity acts on the system, and then the same optimization process is conducted to compute M control quantities of the next moment, and so on. The optimization time domain P indicates how many steps of output of the prediction length in the future from the moment k can approach an expected value, if the P is too small, the rapidity is excellent, but the stability and the robustness are poor; if the P is too large, the stability is excellent, but the adjusting effect is poor. The control time domain M indicates the number of future control quantity changes determined by the system, and a small M value is beneficial to the stability of the control system, but for a complex system, the obtained dynamic performance is poor; a large M value represents that more steps of control increment changes are allowed, thus the flexibility of control is improved, and the response is faster, but the system is likely to be unstable. In a general condition, for an object with simple dynamic response, M=1-2; for an object with complex dynamic response such as oscillation and the like, M=4-8. It must be noted that M<P.

Figure 3:
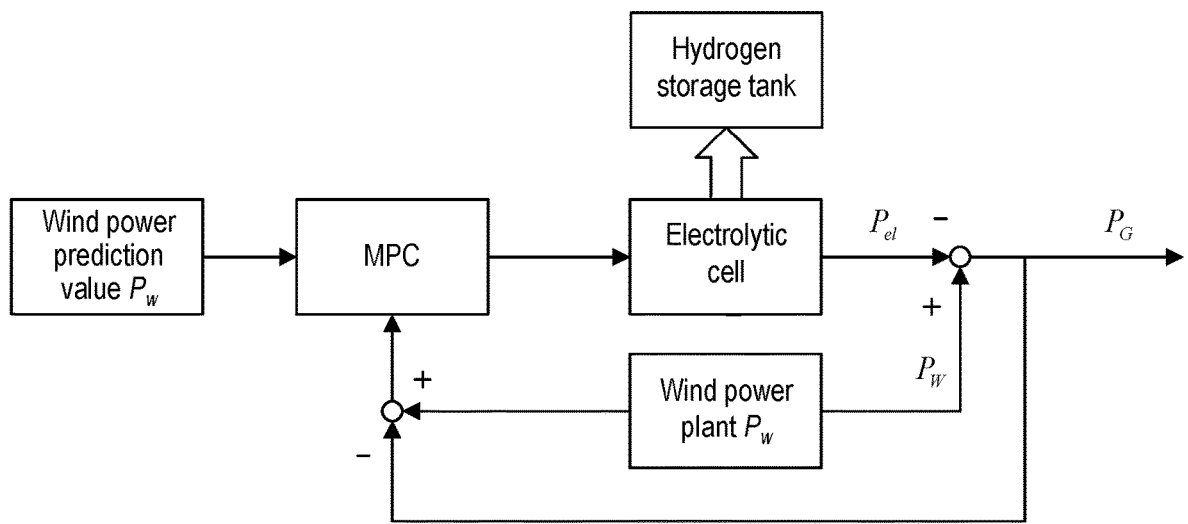
FIG. 3 is a flow diagram of dynamic matrix control of the present invention.

To make the grid-connected power track the wind power curve as much as possible, a related model is established according to a dynamic matrix requirement, by analyzing a flowing direction of the power in system, a control flow diagram between individual powers is combed out as shown in FIG. 3. In the figure, $P_W$ denotes the power of a wind turbine in a wind power plant, $P_W'$ denotes a power prediction value of the wind turbine in the wind power plant, $P_G$ denotes the grid-connected power, and $P_{el}$ denotes the electrolytic cell power control quantity. Therefore, the step (2) of the present invention is specifically as follows:
(21) constructing a prediction model based on dynamic matrix control:

$$\begin{cases} x(k+1) = Ax(k) + B_u u(k) + B_d d(k) \\ y(k) = Cx(k) + Du(k) \end{cases}$$

x(k) is a state quantity, u(k) is a control input, d(k) is disturbance, y(k) is an output, A, $B_u$, $B_d$, C and D are coefficient matrices, specifically as follows:

$$x(k) = \begin{bmatrix} x_1(k) \\ x_2(k) \end{bmatrix} = \begin{bmatrix} P_G(k) \\ P(k) \end{bmatrix},$$

$$u(k) = P_{el}(k),$$

-continued $$y(k) = P_G(k),$$

$$d(k) = P_W(k),$$

$$A = \begin{bmatrix} 0 & 0 \\ 0 & 1 \end{bmatrix},$$

$$B_u = \begin{bmatrix} -1 \\ \eta T p_0 / V \end{bmatrix},$$

$$B_d = \begin{bmatrix} 1 \\ 0 \end{bmatrix},$$

$$C = \begin{bmatrix} 1 \\ 0 \end{bmatrix},$$

$$D = [0\ 0],$$

wherein k is a sampling moment, $P_G(k)$ denotes the grid-connected power, $P(k)$ denotes the pressure of a hydrogen storage tank, $P_d(k)$ denotes the electrolytic cell power control quantity, $P_W(k)$ denotes wind turbine power of a wind power plant, $\eta$ denotes a conversion efficiency of converting electric energy consumed by the electrolytic cell into a certain volume of hydrogen energy, T is a sampling time interval, V is the volume of the hydrogen storage tank, $p_0$ is the standard atmospheric pressure, and $p_0$=0.1 MPa;

(22) constructing a constraint:

$$P_{el\ min} \leq P_{el}(k) \leq P_{el\ max},$$

$$P_{min} \leq P(k) \leq P_{max},$$

$P_{el\ min}$ is the minimum power of an electrolytic cell array, $P_{el\ max}$ is the maximum power of the electrolytic cell array, $P_{min}$ is the minimum pressure of a hydrogen storage tank system, and $P_{max}$ is the maximum pressure of the hydrogen storage tank system;

(23) constructing a target function:

$$\min J(k) = \sum_{i=1}^{P} q_i (P'_W(k+i) - P_G(k+i|k))^2 + \sum_{j=1}^{M} r_j \Delta P_{el}^2 (k+j-1)$$

wherein P denotes a prediction length of the dynamic matrix control, M denotes a control length of the dynamic matrix control, $P_W'(k+i)$ denotes a prediction value of the wind power at the moment k+i in the wind power prediction curve, $P_G(k+i|k)$ denotes grid-connected power at the moment k+i predicted and output at the prediction moment k, $\Delta P_{el}(k+j-1)$ denotes an electrolytic cell power control quantity increment at the k+j−1 moment, and $q_i$ and $r_j$ are an error output weight coefficient and a control increment weight coefficient at the moment i from the moment k;

(24) solving M electrolytic cell power control quantity increments enabling the target function to be optimal according to a prediction model and the constraint condition, and obtaining the electrolytic cell power control quantity for the lower-layer electrolytic cell control based on the first control increment, specifically, the problem of solving the control increment enabling the target functional to be optimal according to the prediction model and the constraint condition in the step being a quadratic programming problem, and being a rolling optimization process, i.e., solving the corresponding quadratic programming optimal solution at each moment, applying the first control increment to a system, performing the same operation again at the next moment, then solving a primary quadratic programming problem and applying the first control increment to the system, and so on, thus enabling the actual grid-connected power to follow an instruction curve to the greatest extent.

The step (4) is specifically as follows:

(41) sequencing the electrolytic cell monomers in the electrolytic cell array, determining rotation cycles, and adjusting the arrangement sequence of the electrolytic cell monomers at the end of each rotation cycle;

(42) at an initial moment of each rotation cycle, determining the number of the electrolytic cell monomers operating in four operation states according to the electrolytic cell power control quantity, sequentially assigning the operation states of various electrolytic cell monomers from the electrolytic cell monomer at the first position backwards according to the current arrangement sequence of the electrolytic cell monomers; within a time period of the rotation cycle, when the electrolytic cell power control quantity fluctuates, determining the number of the electrolytic cell monomers operating in the four operation states according to the current electrolytic cell power control quantity, and based on the electrolytic cell monomers in the fluctuating power operation state at a previous moment, still configuring the electrolytic cell monomers in the fluctuating power operation state at the previous moment to be in the fluctuating power operation state; and meanwhile, sequentially configuring the operation states of various electrolytic cell monomers forwards until reaching the electrolytic cell monomer at the first position, and then continuing to sequentially configure working states of various electrolytic cell monomers forwards from the electrolytic cell monomer at the last position until reaching the electrolytic cell monomer in the fluctuating power operation state.

A specific mode of adjusting the arrangement sequence of the electrolytic cell monomers in the step (41) is as follows: moving the electrolytic cell monomer at the first position in the previous rotation cycle to the last position.

A specific mode of determining the number of the electrolytic cell monomers at the initial moment of each rotation cycle as well as within the time period of the rotation cycle (42) is as follows:

(421) determining whether the electrolytic cell array is in an overload state or not according to the electrolytic cell power control quantity $P_{el}$ and an actually configured capacity $P_{pz}$ of the electrolytic cell array, and if $P_{el} \leq P_{pz}$, regarding that the electrolytic cell array is not overloaded, executing a step (422), otherwise, regarding that the electrolytic cell array is overloaded, executing a step (423), wherein $P_{pz}$=n$P_e$ and $P_e$ is the rated power of the electrolytic cell monomer, and n is the total configuration number of the electrolytic cell monomers;

(422) determining the number N11 of the electrolytic cell monomers configured to be in a rated power operation state, the number N12 of the electrolytic cell monomers configured to be in a fluctuating power operation state, and the number N1$_3$ of the electrolytic cell monomers configured to be in a shutdown operation state according to the electrolytic cell power control quantity $P_{el}$, and satisfying that N11+N12+N13=n; and (423) determining the number $N_{21}$ of the electrolytic cell monomers configured to be in an overload power operation state, the number $N_{22}$ of the electrolytic cell monomers configured to be in a fluctuating power operation state, and the number $N_{23}$ of the electrolytic cell monomers configured to be in the rated power operation state according to the electrolytic cell power control quantity $P_{el}$, and satisfying that $N_{21}+N_{22}+N_{23}$=n.

$N_{11}$, $N_{12}$ and $N_{13}$ in the step (422) are specifically as follows:

$$N_{11} = \left\lfloor \frac{P_{el}}{P_e} \right\rfloor$$

wherein $\lfloor \ \rfloor$ denotes floor, if $N_{11}=n$, regarding that $N_{12}=N_{13}=0$, wherein all electrolytic cell monomers are configured to operate in the rated power operation state;

if $N_{11}<n$, regarding that $N_{12}=1$, $N_{13}=n-N_{11}-1$.

$N_{21}$, $N_{22}$ and $N_{23}$ in the step (423) are specifically as follows:

firstly, determining an overload quantity $P_{OL}=P_{el}-nP_e$, then, acquiring $N_{21}$ through the following formula, $$N_{21} = \left\lfloor \frac{P_{OL}}{(\varphi-1)P_e} \right\rfloor,$$

wherein $\lfloor \ \rfloor$ denotes floor, and finally, if $P_{OL}-N_{21}\cdot(\varphi-1)P_e=0$, regarding that $N_{22}=0$, $N_{23}=n-N_{21}$, if $P_{OL}-N_{21}\cdot(\varphi-1)P_e\neq 0$, regarding that $N_{22}=1$, $N_{23}=n-N_{21}-1$, wherein $\varphi$ is an overload coefficient of the electrolytic cell.

Assigning the operation states of the electrolytic cell monomers at the initial moment of each rotation cycle in the step (42) is specifically as follows:

in a case of a non-overload state, sequentially configuring $N_{11}$ electrolytic cell monomers to operate in the rated power operation state, configuring $N_{12}$ electrolytic cell monomers to operate in the fluctuating power operation state, and configuring $N_{13}$ electrolytic cell monomers to operate in the shutdown power operation state backwards from the electrolytic cell monomer at the first position according to the current arrangement sequence of the electrolytic cell monomers; and in a case of an overload state, sequentially configuring $N_{21}$ electrolytic cell monomers to operate in the overload power operation state, configuring $N_{22}$ electrolytic cell monomers to operate in the fluctuating power operation state, and configuring $N_{23}$ electrolytic cell monomers to operate in the rated power operation state backwards from the electrolytic cell monomer at the first position according to the current arrangement sequence of the electrolytic cell monomers.

Configuring the operation states of various electrolytic cell monomers forwards within the time period of the rotation cycle based on the electrolytic cell monomers in the fluctuating power operation state at the previous moment in the step (42) is specifically as follows:

in a case of a non-overload state, configuring the electrolytic cell monomers in the rated operation state and the shutdown operation state according to the following mode: sequentially configuring the electrolytic cell monomers in the rated operation state and the shutdown operation state alternately until one operation state in the rated operation state or the shutdown operation state is completely configured, and then sequentially configuring the other operation state which is not completely configured; and in a case of an overload state, configuring the electrolytic cell monomers in the rated operation state and the overload operation state according to the following mode: sequentially configuring the electrolytic cell monomers in the rated operation state and the overload operation state alternately until one operation state in the rated operation state or the overload operation state is completely configured, and then sequentially configuring the other operation state which is not completely configured.

An MPC-based hierarchical coordinated control device for a wind-hydrogen coupling system, wherein the device comprises a memory and a processor; the memory is used for storing computer programs, and the processor is used for implementing the MPC-based hierarchical coordinated control method for the wind-hydrogen coupling system when executing the computer programs.

Figure 4:
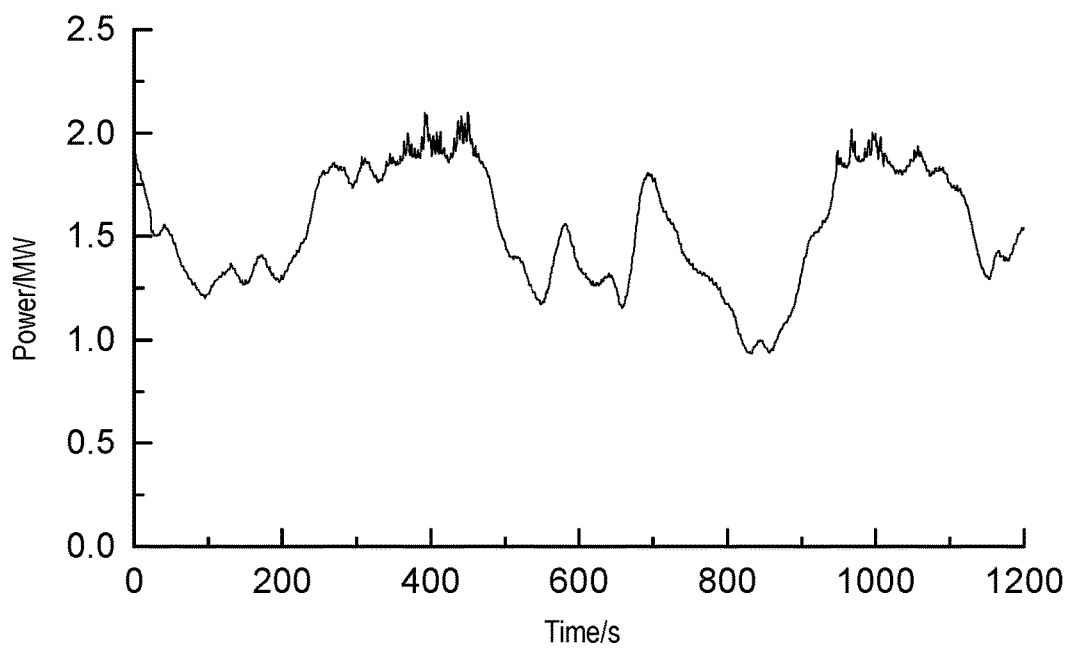
FIG. 4 is a wind power prediction curve of a 2 MW wind turbine at a wind field in Zhangbei on a certain day in an embodiment of the present invention.

In the process of controlling the power of the electrolytic cell, due to the fact that the electrolytic cell has a certain time delay characteristic, in order to make the electrolytic cell comply with scheduling better, wind power prediction is introduced to conduct time migration on the control of the electrolytic cell, and meanwhile, the wind power prediction is combined with dynamic matrix control to improve the scheduling performance of the electrolytic cell system as well as the control accuracy. As shown in FIG. 4, the verification of the dynamic matrix control is conducted by taking a wind power prediction curve of a 2MW wind turbine at a wind field in Zhangbei on a certain day as an example.

To make the electrolytic cell system meet the corresponding wind power absorption needs, on the basis of sufficiently considering the overload characteristic of the electrolytic cell, the electrolytic cell system is configured to be composed of four electrolytic cell monomers of 500 kW. The simulation verification is conducted under the action of the wind power curve, with simulation parameters as shown in Table 1:

TABLE 1

| Simulation parameters | | | |
| --- | --- | --- | --- |
| Simulation duration/s | 1200 | Optimization time domain/s | 10 |
| Electrolytic cell monomer capacity/kW | 300 | Control time domain/s | 1 |
| | | Number of electrolytic cell monomers/pc | 4 |
| Rotation time/s | 300 | | |

Figure 5A:
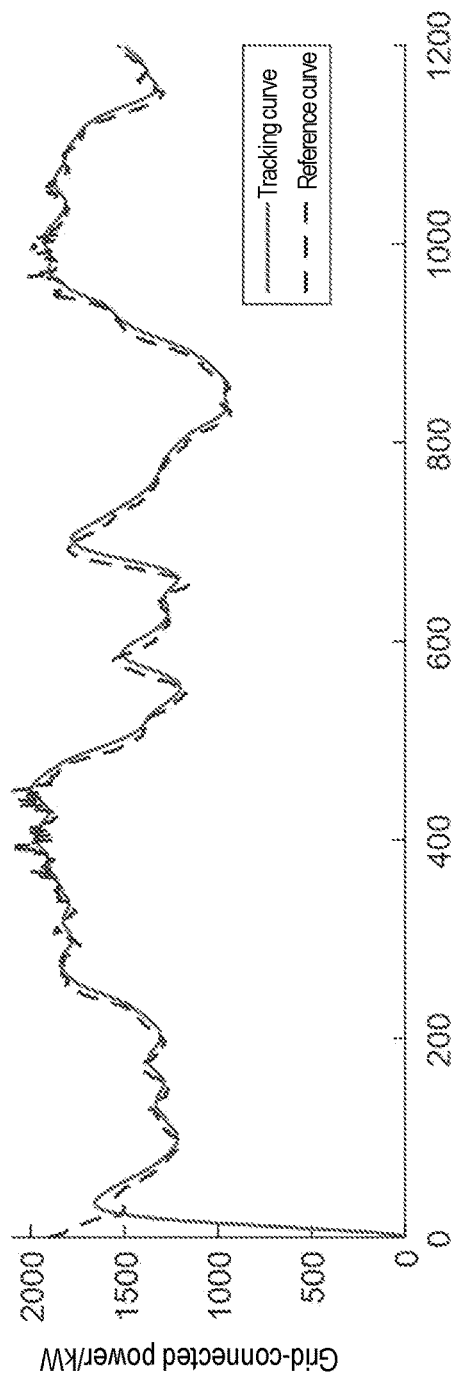
FIGS. 5A and 5B are a tracking effect diagram and an electrolytic cell power curve in an embodiment of the present invention.
Figure 5B:
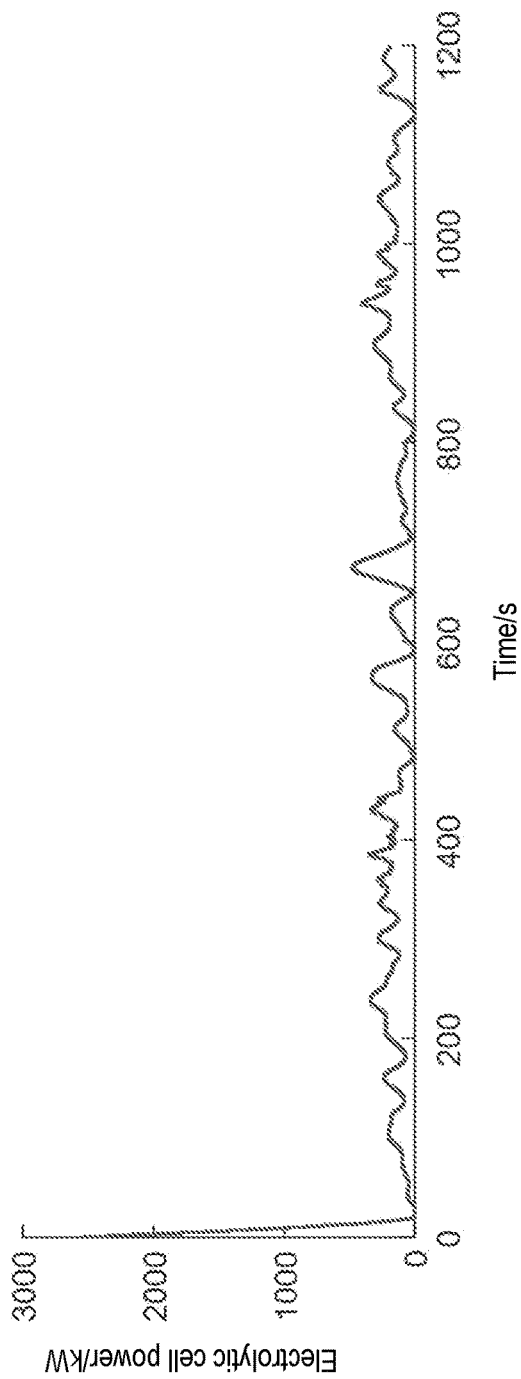
Figure 6A:
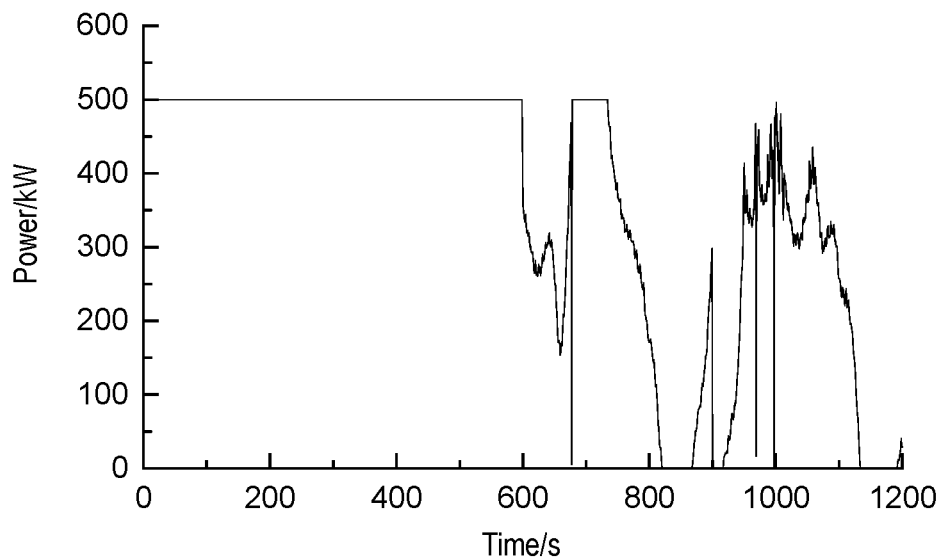
FIGS. 6A to 6D are electrolytic cell power curves under a time-power double-line rotation control strategy in the present invention.
Figure 6B:
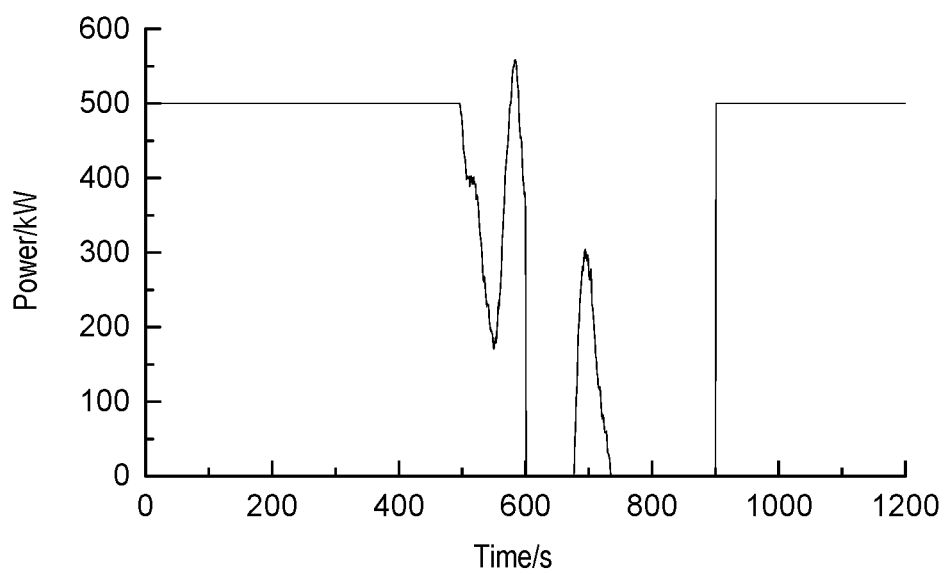
Figure 6C:
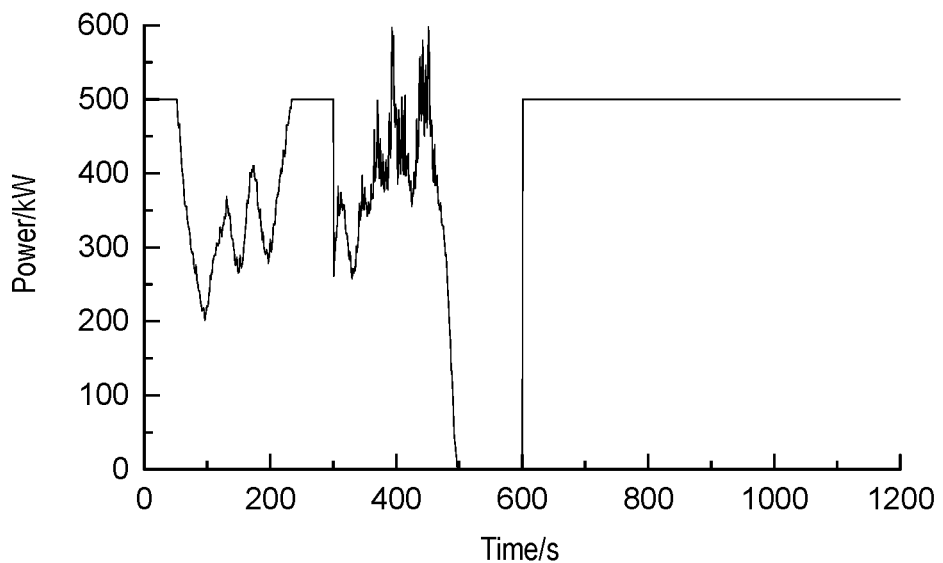
Figure 6D:
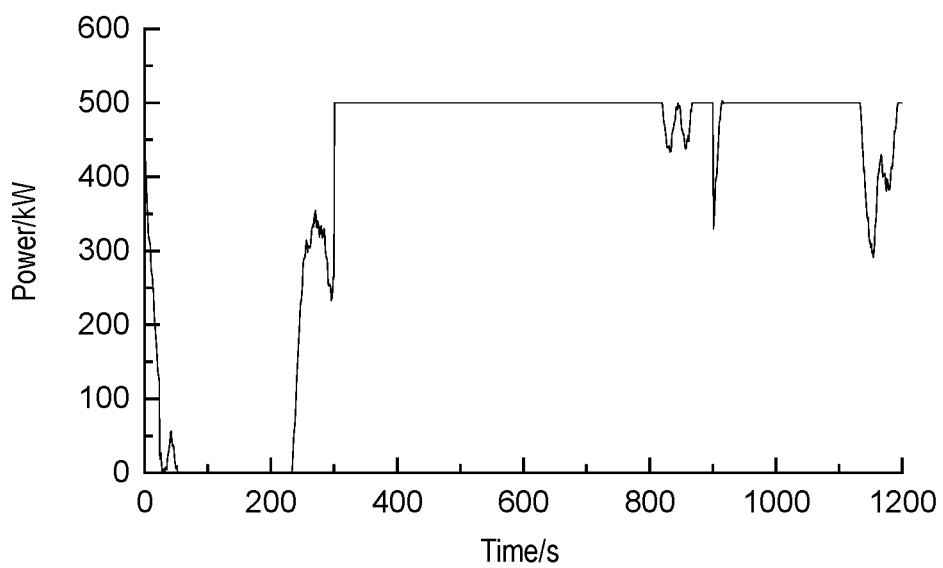
Figure 7A:
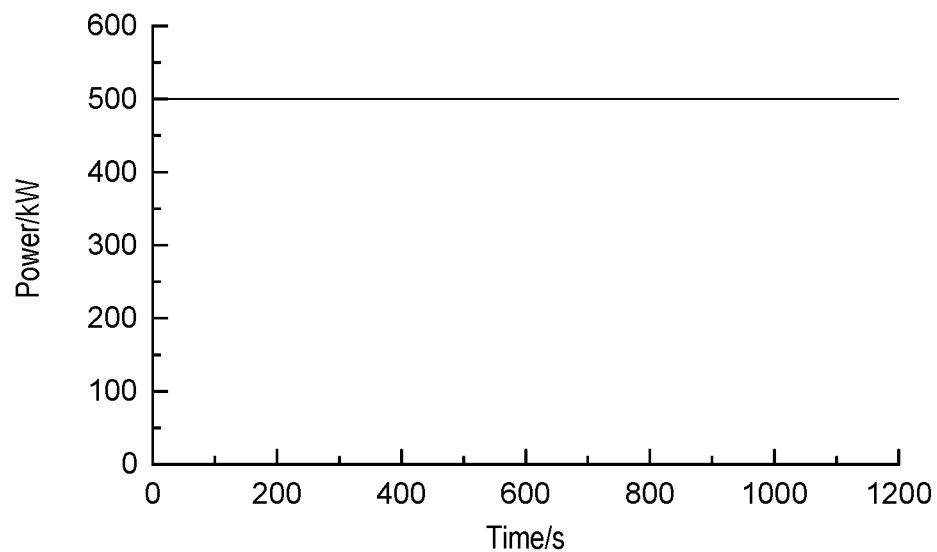
FIGS. 7A to 7D are electrolytic cell power curves without a time-power double-line rotation control strategy.
Figure 7B:
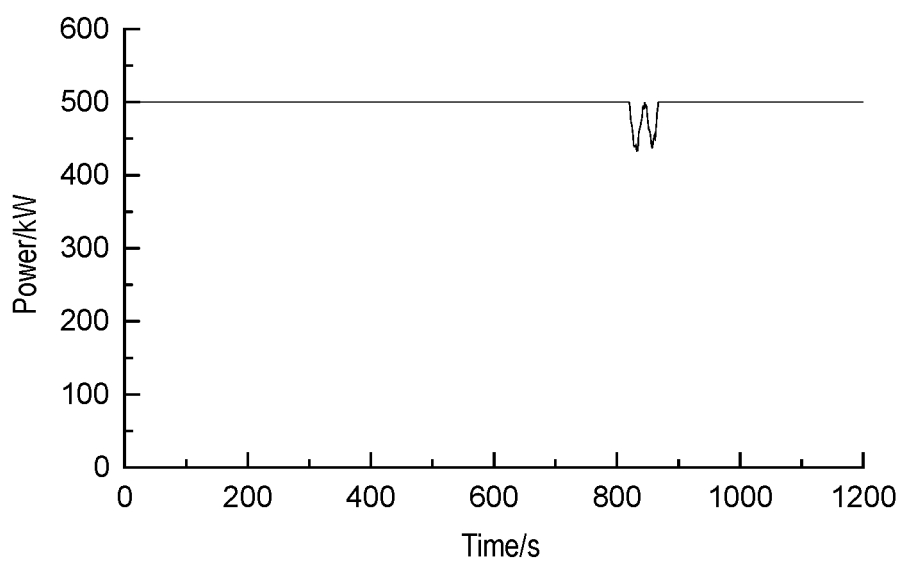
Figure 7C:
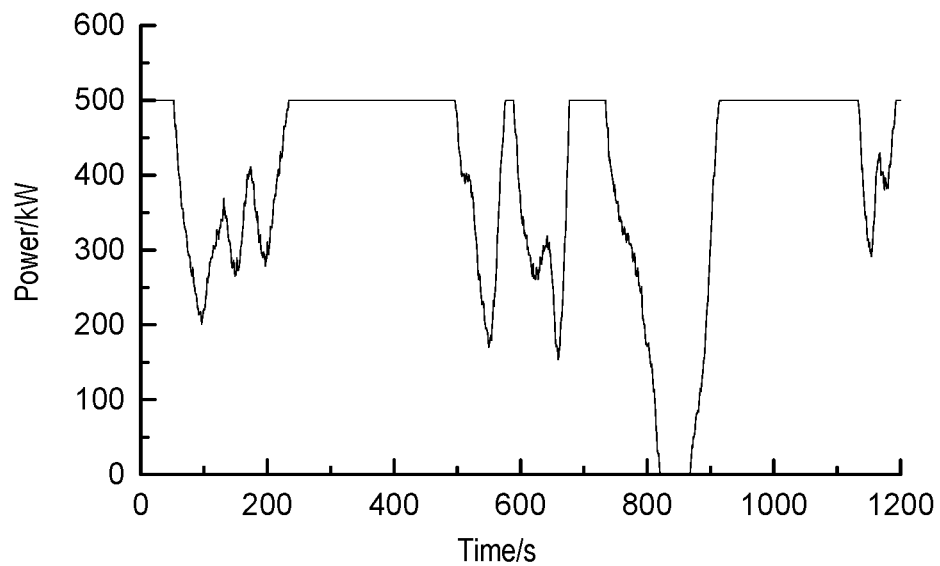
Figure 7D:
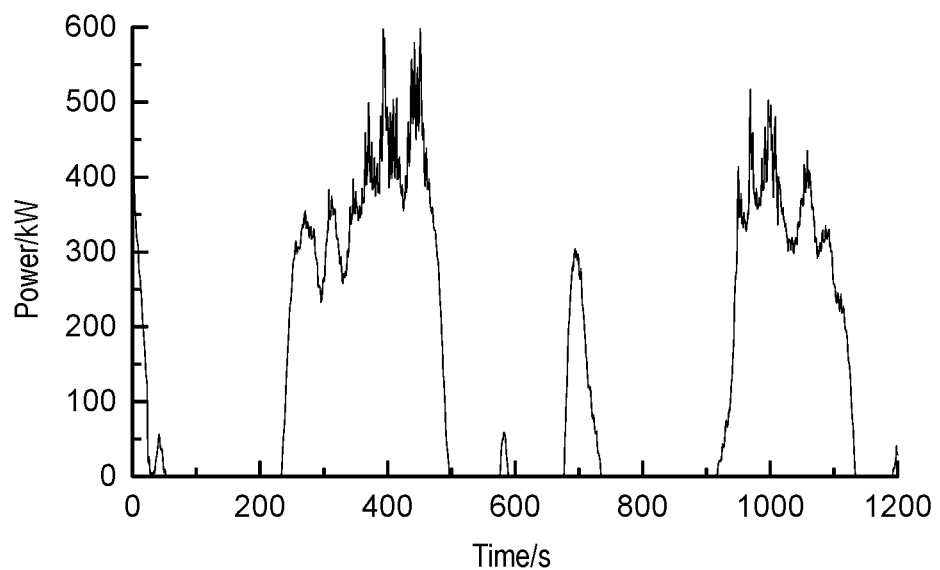

The MATLAB simulation of the DMC algorithm is conducted according to above parameter setting, with a result as shown in FIGS. 5A and 5B, wherein a reference curve is the wind power curve, and the tracking curve is the grid-connected power. It shows that the grid-connected power can follow a wind power instruction better, as shown in FIG. 5A; and meanwhile, due to the fact that most of the wind power is absorbed in a grid-connected manner, the power of the electrolytic cell system is at a relatively low level, as shown in FIG. 5B.

Under an off-grid state, the wind power is completely absorbed by the electrolytic cell system, by numerically analyzing the wind power, combining the quantity grade of the capacity of the electrolytic cell monomers on the market and considering the short-time overload capacity of the electrolytic cell, four electrolytic cell monomers of 500 kW are selected to form an electrolytic cell system. FIGS. 6A to 6D are a curve of power consumed by four electrolytic cell units in an off-grid state according to a time-power double-line rotation control strategy, and FIGS. 6A to 6D are power change curves of 1#-4# electrolytic cell monomers in sequence.

To compare and analyze the performance of the electrolytic cell system with or without the rotation strategy, the same wind power curve is applied to the electrolytic cell system without the time-power double-wire rotation control strategy to obtain a result as shown in FIGS. 7A to 7D, and FIGS. 7A to 7D are the power change curves of the 1#-4# electrolytic cell cells in sequence.

A corresponding parameter index is proposed according to the power curve of the electrolytic cell, within the operation cycle of the electrolytic cell, the percentage of time that the power of the electrolytic cell is at rated power is defined as $Y_e$, the percentage of time that the power of the electrolytic cell is at fluctuating power is defined as $Y_s$; the percentage of time that the electrolytic cell is at shutdown is defined as $Y_t$; and the percentage of time that the electrolytic cell is at the operation power below the hydrogen safe power non-shutdown state is defined as $Y_q$.

TABLE 2

Data comparison of simulation result

| | | $Y_e$/% | $Y_s$/% | $Y_t$/% | $Y_q$/% |
|---|---|---|---|---|---|
| With time-power double-line rotation control strategy | 1 | 54.67 | 34.92 | 10.41 | 5 |
| | 2 | 66.42 | 13.58 | 20 | 1.5 |
| | 3 | 59.92 | 31.42 | 8.66 | 0.58 |
| | 4 | 64.67 | 20.25 | 15.08 | 2.9 |
| Without time-power double-line rotation control strategy | 1 | 100 | 0 | 0 | 0 |
| | 2 | 96 | 4 | 0 | 0 |
| | 3 | 50.83 | 45.17 | 4 | 1.92 |
| | 4 | 0 | 51 | 49 | 9.08 |

Table 2 is a data comparison table of the simulation results with the coordinated rotation control strategy and without the coordinated rotation control strategy. It can be seen from the table data that, compared with the condition without the coordinated control strategy, the percentage of time of the operation state of each electrolytic cell monomer with the coordinated rotation control strategy is relatively stable, and the rotation strategy prevents the electrolytic cell from excessive temperature drop due to long shutdown time. Similarly, in terms of safety in hydrogen production, the percentage of time in low-power operation is less than 5%, the dangerous operation time is reduced by 45% compared with the highest 9.08% in the situation without the rotation control strategy, thus guaranteeing that the mixing concentration of hydrogen and oxygen cannot reach the explosion limit during the operation of the electrolytic cell.

The whole system of the present invention employs a hierarchical control strategy, an MPC control algorithm (model predictive control) on the upper layer starts from the system level, the wind power is absorbed in a grid-connected manner as much as possible under the grid-connected condition, and an electrolytic cell control strategy on the lower layer is used to coordinate the power distribution of various electrolytic cell monomers. The wind power prediction and the dynamic matrix control are combined to develop a scheduling plan of the grid-connected power through the predicted wind power, and the tracking accuracy of the grid-connected power is improved by applying a dynamic matrix control algorithm. The lower layer employs a time-power double-line rotation control strategy, the time-based rotation is achieved by adjusting the arrangement sequence of the electrolytic cell monomers at the end of each rotation cycle, and the power-based rotation is achieved by configuring the operation states of other electrolytic cell monomers based on the electrolytic cell monomers in the fluctuating power operation state at the previous moment according to the electrolytic cell power control quantity in the rotation cycle; the influence of the temperature drop caused by the long shutdown time of the electrolytic cell on the reaction speed of the electrolytic cell can be avoided through the time-based rotation, the potential safety hazards caused by the fact that the power is lower than the hydrogen production safety power for a long time can be avoided through the power-based rotation, and the service life and the operation safety of the system can be prolonged by the double-line rotation strategy.

The embodiments described above are merely exemplary and are not meant to limit the scope of the present invention. These embodiments may also be implemented in various other ways, and various omissions, substitutions, and changes can be made without departing from the scope of the technical idea of the present invention.

What is claimed is:

1. An MPC-based hierarchical coordinated control method for a wind-hydrogen coupling system, comprising the following steps:
   step (1) dividing the wind-hydrogen coupling system into an upper-layer grid-connected control and a lower-layer electrolytic cell control;
   step (2) controlling grid-connected power to track a wind power prediction curve by adopting an MPC control algorithm for the upper-layer grid-connected control, and obtaining an electrolytic cell power control quantity for the lower-layer electrolytic cell control at the same time, wherein the MPC is model predictive control;
   step (3) dividing operation states of electrolytic cell monomers into four operation states of rated power operation, fluctuating power operation, overload power operation and shutdown; and
   step (4) determining the operation states of various electrolytic cell monomers by adopting a time-power double-line rotation control strategy based on the electrolytic cell power control quantity, thus making the electrolytic cell monomers operate in one of the four operating states in turn.

2. The MPC-based hierarchical coordinated control method for the wind-hydrogen coupling system according to claim 1, wherein the step (2) is specifically as follows:
   step (21) constructing a prediction model based on dynamic matrix control:

$$\begin{cases} x(k+1) = Ax(k) + B_u u(k) + B_d d(k) \\ y(k) = Cx(k) + Du(k) \end{cases}$$

wherein x(k) is a state quantity, u(k) is a control input, d(k) is disturbance, y(k) is an output, A, $B_u$, $B_d$, C and D are coefficient matrices, specifically as follows:

$$x(k) = \begin{bmatrix} x_1(k) \\ x_2(k) \end{bmatrix} = \begin{bmatrix} P_G(k) \\ P(k) \end{bmatrix},$$

$$u(k) = P_{el}(k),$$

$$y(k) = P_G(k),$$

$$d(k) = P_W(k),$$

$$A = \begin{bmatrix} 0 & 0 \\ 0 & 1 \end{bmatrix},$$

$$B_u = \begin{bmatrix} -1 \\ \eta T p_0 / V \end{bmatrix},$$

$$B_d = \begin{bmatrix} 1 \\ 0 \end{bmatrix},$$

-continued $$C = \begin{bmatrix} 1 \\ 0 \end{bmatrix},$$

$$D = [0\ 0],$$

wherein k is a sampling moment, $P_G(k)$ denotes the grid-connected power, P(k) denotes the pressure of a hydrogen storage tank, $P_{el}(k)$ denotes the electrolytic cell power control quantity, $P_W(k)$ denotes wind turbine power of a wind power plant, η denotes a conversion efficiency of converting electric energy consumed by the electrolytic cell into a certain volume of hydrogen energy, Tis a sampling time interval, V is a volume of the hydrogen storage tank, $p_0$ is a standard atmospheric pressure, and $p_0=0.1$ MPa;

step (22) constructing a constraint:

$$P_{el\ min} \leq P_{el}(k) \leq P_{el\ max},$$

$$P_{min} \leq P(k) \leq P_{max},$$

wherein $P_{el\ min}$ is a minimum power of an electrolytic cell array, $P_{el\ max}$ is a maximum power of the electrolytic cell array, $P_{min}$ is a minimum pressure of a hydrogen storage tank system, and $P_{max}$ is a maximum pressure of the hydrogen storage tank system;

step (23) constructing a target function:

$$\min J(k) = \sum_{i=1}^{P} q_i (P'_W(k+i) - P_G(k+i|k))^2 + \sum_{j=1}^{M} r_j \Delta P_{el}^2(k+j-1)$$

wherein P denotes a prediction length of a dynamic matrix control, M denotes a control length of the dynamic matrix control, $P_W'(k+i)$ denotes a prediction value of a wind power at the moment k+i in the wind power prediction curve, $P_G(k+i|k)$ denotes the grid-connected power at the moment k+i predicted and output at the prediction moment k, $\Delta P_{el}(k+j-1)$ denotes an electrolytic cell power control quantity increment at the k+j−1 moment, and $q_i$ and $r_j$ are an error output weight coefficient and a control increment weight coefficient at the moment i from the moment k; and step (24) according to the prediction model and constraint conditions, solving M electrolytic cell power control quantity increments enabling the target function to be optimal, and obtaining the electrolytic cell power control quantity for the lower-layer electrolytic cell control based on a first control increment.

3. The MPC-based hierarchical coordinated control method for a wind-hydrogen coupling system according to claim 1, wherein the step (4) is specifically as follows:

step (41) sequencing the electrolytic cell monomers in the electrolytic cell array, determining rotation cycles, and adjusting an arrangement sequence of the electrolytic cell monomers at the end of each rotation cycle; and step (42) at an initial moment of each rotation cycle, determining the number of the electrolytic cell monomers operating in the four operation states according to the electrolytic cell power control quantity, sequentially assigning the operation states of various electrolytic cell monomers from the electrolytic cell monomer at a first position backwards according to the current arrangement sequence of the electrolytic cell monomers; within a time period of the rotation cycle, when the electrolytic cell power control quantity fluctuates, determining the number of the electrolytic cell monomers operating in the four operation states according to the current electrolytic cell power control quantity, and based on the electrolytic cell monomers in the fluctuating power operation state at a previous moment, still configuring the electrolytic cell monomers in the fluctuating power operation state at the previous moment to be in the fluctuating power operation state; and meanwhile, sequentially configuring the operation states of various electrolytic cell monomers forwards until reaching the electrolytic cell monomer at the first position, and then continuing to sequentially configure working states of various electrolytic cell monomers forwards from the electrolytic cell monomer at a last position until reaching the electrolytic cell monomer in the fluctuating power operation state.

4. The MPC-based hierarchical coordinated control method for the wind-hydrogen coupling system according to claim 3, wherein a specific mode of adjusting the arrangement sequence of the electrolytic cell monomers in the step (41) is as follows: moving the electrolytic cell monomer which is located at the first position in the previous rotation cycle to the last position.

5. The MPC-based hierarchical coordinated control method for the wind-hydrogen coupling system according to claim 3, wherein a specific mode of determining the number of the electrolytic cell monomers at the initial moment of each rotation cycle as well as within the time period of the rotation cycle in the step (42) is as follows:

step (421) determining whether the electrolytic cell array is in an overload state or not according to the electrolytic cell power control quantity $P_{el}$ and an actually configured capacity $P_{pz}$ of the electrolytic cell array, and if $P_{el} \leq P_{pz}$, regarding that the electrolytic cell array is not overloaded, executing a step (422), otherwise, regarding that the electrolytic cell array is overloaded, and executing a step (423), wherein $P_{pz}=nP_e$ and $P_e$ is the rated power of the electrolytic cell monomer, and n is the total configuration number of the electrolytic cell monomers;

step (422) determining the number $N_{11}$ of the electrolytic cell monomers configured to be in a rated power operation state, the number $N_{12}$ of the electrolytic cell monomers configured to be in the fluctuating power operation state, and the number $N_{13}$ of the electrolytic cell monomers configured to be in a shutdown operation state according to the electrolytic cell power control quantity $P_{el}$, and satisfying that $N_{11}+N_{12}+N_{13}=n$; and step (423) determining the number $N_{21}$ of the electrolytic cell monomers configured to be in an overload power operation state, the number $N_{22}$ of the electrolytic cell monomers configured to be in the fluctuating power operation state, and the number $N_{23}$ of the electrolytic cell monomers configured to be in the rated power operation state according to the electrolytic cell power control quantity $P_{el}$, and satisfying that $N_{21}+N_{22}+N_{23}=n$.

6. The MPC-based hierarchical coordinated control method for the wind-hydrogen coupling system according to claim 5, wherein the number $N_{11}$, the number $N_{12}$ and the number $N_{13}$ in the step (422) are specifically as follows:

$$N_{11} = \left\lfloor \frac{P_{el}}{P_e} \right\rfloor$$

wherein $\lfloor \ \rfloor$ denotes floor, if $N_{11}=n$, regarding that $N_{12}=N_{13}=0$, wherein all electrolytic cell monomers are configured to operate in the rated power operation state;

if $N_{11}<n$, regarding that $N_{12}=1$, $N_{13}=n-N_{11}-1$.

7. The MPC-based hierarchical coordinated control method for the wind-hydrogen coupling system according to claim 5, wherein $N_{21}$, $N_{22}$ and $N_{23}$ in the step (423) are specifically as follows:

firstly, determining an overload quantity $P_{OL}=P_{el}-nP_e$, then, acquiring the number $N_{21}$ through the following formula, $$N_{21} = \left\lfloor \frac{P_{OL}}{(\varphi-1)P_e} \right\rfloor,$$

wherein $\lfloor \ \rfloor$ denotes floor, and finally, if $P_{OL}-N_{21}\cdot(\varphi-1)P_e=0$, regarding that $N_{22}=0$, $N_{23}=n-N_{21}$, if if $P_{OL}-N_{21}\cdot(\varphi-1)P_e\neq 0$, regarding that $N_{22}=1$, $N_{23}=n-N_{21}-1$, wherein $\varphi$ is an overload coefficient of the electrolytic cell.

8. The MPC-based hierarchical coordinated control method for the wind-hydrogen coupling system according to claim 5, wherein assigning the operation states of the electrolytic cell monomers at the initial moment of each rotation cycle in the step (42) is specifically as follows:

in a case of a non-overload state, sequentially configuring $N_{11}$ electrolytic cell monomers to operate in the rated power operation state, configuring $N_{12}$ electrolytic cell monomers to operate in the fluctuating power operation state, and configuring $N_{13}$ electrolytic cell monomers to operate in the shutdown power operation state backwards from the electrolytic cell monomer at the first position according to the current arrangement sequence of the electrolytic cell monomers; and in a case of an overload state, sequentially configuring $N_{21}$ electrolytic cell monomers to operate in the overload power operation state, configuring $N_{22}$ electrolytic cell monomers to operate in the fluctuating power operation state, and configuring $N_{23}$ electrolytic cell monomers to operate in the rated power operation state backwards from the electrolytic cell monomer at the first position according to the current arrangement sequence of the electrolytic cell monomers.

9. The MPC-based hierarchical coordinated control method for the wind-hydrogen coupling system according to claim 5, wherein configuring the operation states of various electrolytic cell monomer forwards within the time period of the rotation cycle based on the electrolytic cell monomer in the fluctuating power operation state at the previous moment in the step (42) is specifically as follows:

in a case of a non-overload state, configuring the electrolytic cell monomers in the rated operation state and the shutdown operation state according to the following mode: sequentially configuring the electrolytic cell monomers in the rated operation state and the shutdown operation state alternately until one operation state in the rated operation state or the shutdown operation state is completely configured, and then sequentially configuring the other operation state which is not completely configured; and in a case of an overload state, configuring the electrolytic cell monomers in the rated operation state and the overload operation state according to the following mode: sequentially configuring the electrolytic cell monomers in the rated operation state and the overload operation state alternately until one operation state in the rated operation state or the overload operation state is completely configured, and then sequentially configuring the other operation state which is not completely configured.

10. An MPC-based hierarchical coordinated control device for a wind-hydrogen coupling system, comprising a memory and a processor; the memory is used for storing computer programs, and the processor is used for implementing the MPC-based hierarchical coordinated control method for the wind-hydrogen coupling system according to claim 1 when executing the computer programs.

\* \* \* \* \*